G. E. RIPLEY, W. N. GLADSON & R. E. THOMPSON.
PROJECTING APPARATUS FOR MOVING PICTURE MACHINES.
APPLICATION FILED OCT. 14, 1910.
1,025,074.
Patented Apr. 30, 1912.
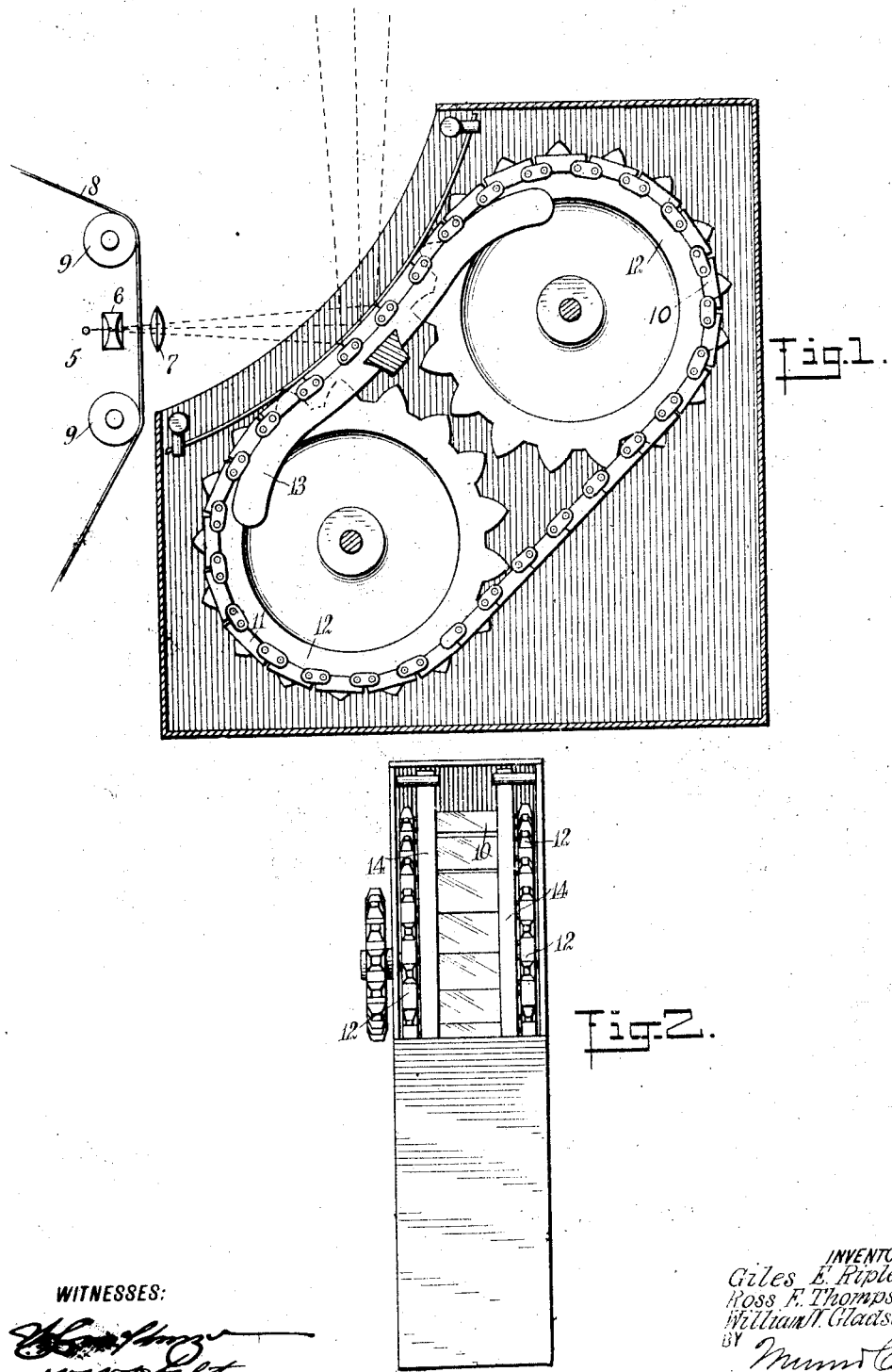

UNITED STATES PATENT OFFICE.

GILES E. RIPLEY AND WILLIAM N. GLADSON, OF FAYETTEVILLE, AND ROSS E. THOMPSON, OF HEBER, ARKANSAS.

PROJECTING APPARATUS FOR MOVING-PICTURE MACHINES.

1,025,074.      Specification of Letters Patent.      Patented Apr. 30, 1912.

Application filed October 14, 1910. Serial No. 587,022.

*To all whom it may concern:*

Be it known that we, GILES E. RIPLEY and WILLIAM N. GLADSON, residents of Fayetteville, in the county of Washington and State of Arkansas, and ROSS E. THOMPSON, a resident of Heber, in the county of Cleyburn and State of Arkansas, all citizens of the United States, have invented a new and Improved Projecting Apparatus for Moving-Picture Machines, of which the following is a full, clear, and exact description.

The invention is an improvement in projecting apparatus for moving picture machines, and has in view a reflecting mechanism to cause the image of one picture to fade into the next without employing a tinted or softening light, or otherwise lessening the brilliancy of the screen during the picture change. To accomplish this we provide a number of reflecting members which are caused to successively pass into an active position to rays from the projecting lenses of the picture machine, and project said rays on the screen. Each reflecting member as it moves through the active portion of its path of travel causes the reflected rays to travel across the screen at the same time that a picture on the film is moving through the cone of light from the condensing lenses, thereby holding the field on the screen stationary and causing one picture to fade into the next. If the successive pictures on the moving film are identical the reflected pictures on the screen will be stationary, but if the successive pictures on the film show a change of position of the object photographed the reflected pictures will show a like change. Each reflecting member as it moves into an active position sends its part of the picture to the screen at the point where the picture of the advanced active member is just fading away.

Reference is to be had to the accompanying drawings forming a part of this specification, in which similar characters of reference indicate corresponding parts in both views.

Figure 1 is a sectional view, illustrating in a general way our improved projecting apparatus; and Fig. 2 is a sectional edge view of the same.

For the purpose of illustrating the nature and application of our improvements, we have shown diagrammatically the prime features of a moving picture machine, in which 5 is a source of light, 6 the condensing lenses, 7 the projecting lenses and 8 the film passing between the two sets of lenses over the guide rollers 9. To cause one picture to fade into the next on the screen without softening or tinting the light, or otherwise lessening the brilliancy of the light on the screen, we provide a reflecting mechanism comprising a series of mirrors or other reflecting members 10, which are arranged relatively to the machine to successively pass into an active position with respect to the rays from the lenses 7, the mirrors being guided in a curved path, in passing through the active sphere of their travel, the radius of which curve depends on the position of the mirrors in the path of light and the focal length of the lenses. To carry out this mode of operating the reflecting members or mirrors we preferably apply them to an endless carrier 11, which carrier, as shown, is in the nature of two chains arranged side by side, with the mirrors extending between the chains and the chains passing over two sets of sprocket wheels 12. By means of two arcs 13, placed at the outer sides of the two sets of sprocket wheels, with their outer concave edges adjacent to the active portion of the path of travel of the endless carrier, the reflecting members are caused to assume the desired reëntrant angle relatively to each other in the projection of the picture. To keep this portion of the carrier against the arcs 13, we have shown two springs 14 arranged at opposite sides of and pressing the carrier inwardly. The reflecting members or mirrors 10 are shown to be plane and placed relatively close together.

The carrier is driven in a direction opposite to the direction of movement of the film, and in such sequence thereto, that as the center of each picture reaches an axial position between the lenses, the axial ray of the latter will strike the center of the actively-disposed mirror. The mirrors by moving on the arc of a circle with their centers tangent to the radii of the circle and their planes normal to them when of the proper width and properly placed in the light, will make such an angle with one another as will cause the image of one picture to fade into the next, the film moving continuously and at such a rate that as a picture moves through the path of light a mirror has also moved through it, but in the opposite direction. If two pictures are exactly alike, one will pass into the other so that the eye is not able to note the change. The mirrors, of course, must come into play with a certain angle to each other, as above set out, and hold this angle as long as they receive the light. After they cease being active, then this angle may vary.

Having thus described our invention, we claim as new and desire to secure by Letters Patent:

1. In a projecting apparatus for moving picture mechanisms, a series of reflecting members successively movable into a position to receive and reflect the picture rays, the adjacent members forming a reëntrant angle with each other during their reflecting period to cause the image of one picture to fade into the next.

2. In a projecting apparatus for moving picture mechanisms, a series of reflecting members successively movable in a path concave toward the film and into a position to receive and reflect the picture rays, the curvature of the said path causing adjacent members to assume such an angle to each other during their reflecting period as to make the image of one picture fade into the next.

3. In a projecting apparatus for moving picture mechanisms, an endless carrier, an arc adjacent to said carrier concave toward the film, a series of reflecting members carried by the carrier adapted to be successively brought into an active position on said arc to receive and reflect the rays passing from the picture, and means keeping said reflectors in engagement with said arc.

4. The combination of a moving picture machine having a picture film moving in one direction, and an endless carrier having a series of reflecting members arranged to successively pass in the lighted field of the machine on a curved arc to cause one picture to fade into the next when the carrier is driven in a direction to cause the said members in crossing said field to travel oppositely to the picture film.

5. In an exhibit apparatus for moving picture mechanisms, an endless carrier, a series of reflecting members carried by the carrier and arranged to successively move into a position to receive and reflect the picture rays, and guiding arcs to cause adjacent members to assume an angle to each other during their reflecting period.

6. In an exhibit apparatus for moving picture machines, an endless chain carrier having a series of reflecting members arranged to successively pass into and out of an active position, a guide having a guiding face concave toward the film for the carrier, arranged at the said active position, and means yieldingly pressing the carrier to the said guide.

In testimony whereof we have signed our names to this specification in the presence of two subscribing witnesses.

GILES E. RIPLEY.
WILLIAM N. GLADSON.
ROSS E. THOMPSON.

Witnesses to the signatures of Giles E. Ripley and William N. Gladson:
   E. L. NETTLESHIP,
   GUY PHILLIPS.

Witnesses to the signature of Ross E. Thompson:
   ALF H. SCHOYEN,
   A. W. GREGG.